(12) United States Patent
Uchisasai et al.

(10) Patent No.: US 7,351,173 B2
(45) Date of Patent: Apr. 1, 2008

(54) TRANSMISSION CONTROLLER FOR CONTINUOUSLY VARIABLE TRANSMISSION SYSTEM

(75) Inventors: Hiroaki Uchisasai, Wako (JP);
Yoshiaki Tsukada, Wako (JP);
Hiroyuki Kojima, Wako (JP); Takashi Ozeki, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 299 days.

(21) Appl. No.: 11/235,498

(22) Filed: Sep. 26, 2005

(65) Prior Publication Data

US 2006/0068972 A1 Mar. 30, 2006

(30) Foreign Application Priority Data

Sep. 29, 2004 (JP) .............................. 2004-283288

(51) Int. Cl.
*F16H 3/72* (2006.01)
(52) U.S. Cl. ........................................................... 475/5
(58) Field of Classification Search .................... 475/5;
477/3; 180/65.7, 65.8
See application file for complete search history.

(56) References Cited

U.S. PATENT DOCUMENTS 6,427,793 B1 * 8/2002 Hanada et al. ............. 180/65.2
6,547,024 B2 * 4/2003 Ohyama et al. ............. 180/227
6,602,157 B2 * 8/2003 Kashiwase ...................... 475/5
6,663,524 B2 * 12/2003 Gu et al. ......................... 475/5
7,255,188 B2 * 8/2007 Tsukada et al. ............. 180/65.5

FOREIGN PATENT DOCUMENTS

JP 6-249328 9/1994

* cited by examiner

*Primary Examiner*—Dirk Wright
(74) *Attorney, Agent, or Firm*—Hamre, Schumann, Mueller & Larson, P.C.

(57) ABSTRACT

A transmission controller for a continuously variable transmission system steadily returns a gear ratio toward the low-ratio range during deceleration, even in a hybrid vehicle which stops an engine during deceleration. A control unit determines the return-start number of revolutions of a driving pulley and the duty ratio of an actuator and issues a control instruction to the actuator which changes the gear ratio by varying the groove width of the driving pulley. The control instruction is issued after an engine stop instruction from a drive control element and the return-start number of revolutions is set higher as the gear ratio is closer to the top-ratio range.

16 Claims, 11 Drawing Sheets

*Fig.* 2

(① Gear Ratio/Return-Start Number of Revolutions Map)

(② Gear Ratio/Duty Ratio Map)

(③ Pulley Rotation-Speed Change Rate/Duty Ratio Map)

TRANSMISSION CONTROLLER FOR CONTINUOUSLY VARIABLE TRANSMISSION SYSTEM

FIELD

The disclosed invention relates to a transmission controller for a continuously variable transmission system and, more particularly, to a transmission controller for a continuously variable transmission system which allows, even in a hybrid vehicle which stops an engine during deceleration or the like, steady returning of the gear ratio of the continuously variable transmission system toward the low-ratio range during deceleration or the like.

BACKGROUND

There has been known a vehicle comprising an actuator for changing, in a transmission mechanism which transmits the driving force of an engine to driving wheels via a belt-type continuously variable transmission system, a gear ratio by varying the groove width of a driving pulley. In the normal driving state of the vehicle mentioned above, the groove width of the driving pulley is smaller in the top-ratio range than in the low-ratio range.

In the above-mentioned vehicle, which has a structure in which a centrifugal start-up clutch is provided on the input side (driving side) of the continuously variable transmission system, when the engine is stopped by turning off an ignition switch with the groove width being smaller in the top-ratio range as described above and then the ignition switch is turned on again, a transmission controller gives to the actuator a signal which shifts the gear ratio toward the low-ratio range. As a result, the groove width of the driving pulley becomes larger in the low-ratio range but, since the groove width is enlarged in the state in which a belt is not rotating, the belt may float from the driving pulley in some cases. Even when the engine is started in this state, the belt can remain floating. When a throttle is opened thereafter, the transmission controller generates a transmission instruction signal in accordance with the opening of the throttle so that the groove width of the driving pulley is reduced by the operation of the actuator. There are cases where a smooth start cannot be made because the belt is driven abruptly at the moment at which the driving pulley tucks it in.

To solve the problem described above, a technology is disclosed in Japanese Patent document JP-A No. 249328/1994 which supplies a transmission instruction to the actuator only when the number of revolutions of the engine is over a predetermined allowable number, i.e. only when the belt is rotating.

However, in a hybrid vehicle in which a free wheeling clutch capable of transmitting power in one direction only is provided between a driven pulley and the driving wheels to reduce useless energy consumption by stopping the engine when the opening of the throttle becomes a specified value or less, the number of revolutions of the engine becomes lower than the specified number of revolutions of the start-up clutch immediately after an engine stop instruction so that the driving pulley undesirably stops in an extremely short period of time. This leads to a problem that it has been difficult to reliably return the gear ratio to the low-ratio range by merely setting the allowable number of revolutions for transmission by using the technology of Japanese Patent document JP-A No. 249328/1994 described above, since the time between the stop of the engine and the stop of the belt wound around the driving pulley is extremely short.

SUMMARY

A transmission controller for a continuously variable transmission system is described which allows, even in a hybrid vehicle which stops the engine during deceleration, steady and reliable returning of the driving pulley to the low-ratio range during deceleration and also allows a reduction in the power consumption of the actuator.

In one embodiment, a transmission controller for a continuously variable transmission system of a vehicle having an engine that includes a crankshaft and having a driving wheel is provided. The transmission system includes a motor, a driving pulley disposed on a side of the motor, a driven pulley for transmitting power to the driving wheel via a free wheeling clutch, a belt wound between the driving pulley and the driven pulley, a start-up clutch connected between the crankshaft of the engine and the driving pulley to transmit power from the crankshaft to the driving pulley when the crankshaft equals or exceeds a specified number of rotations, and gear ratio control means for changing a gear ratio by varying a groove width of the driving pulley. The transmission controller comprises gear ratio detecting means for detecting a gear ratio of the continuously variable transmission system; and pulley number-of-revolution detecting means for detecting the number of revolutions of the driving pulley, wherein the gear ratio control means varies a gear-ratio control start time based on at least one of the gear ratio and a rotating state of the driving pulley.

The gear-ratio control start time is variable in response to at least one of the gear ratio and the rotating state of the driving pulley. Accordingly, even after the engine is stopped with the gear ratio being in the top-ratio range, when the rotation-speed change rate of the driving pulley is high, or the like, the gear ratio can be returned steadily and reliably to the low-ratio range so that a sufficient acceleration is obtainable at the time of restart.

In another embodiment, the transmission controller further comprises throttle opening detecting means for detecting a throttle opening of a throttle valve of the engine, and a drive control element for performing a control operation to stop the engine when the throttle opening becomes a specified value or less, wherein the gear ratio control means starts controlling the gear ratio when the engine is stopped by the drive control element.

The gear-ratio control is started when the engine is stopped based on the signal from the throttle opening detecting means. Accordingly, even in a vehicle equipped with an idling stopping function which stops the engine every time the throttle opening has become a specified value or less, the gear ratio can be returned steadily and reliably to the low-ratio range so that a sufficient acceleration is obtainable at the time of restart.

In another embodiment, the gear ratio control means starts controlling the gear ratio at a point where the number of revolutions of the driving pulley equals or exceeds a reference number of revolutions that increases as the gear ratio of the continuously variable transmission system increases. Accordingly, even when the gear ratio is in the top-ratio range and an amount of movement to the low-ratio range is large, the gear ratio can be returned steadily and reliably to the low-ratio range so that a sufficient acceleration is obtainable at the time of restart.

In yet another embodiment, the gear ratio control means includes an actuator having an output amount which changes based on a duty ratio of a control signal, and the duty ratio of the control signal supplied to the actuator is increased as the gear ratio of the continuously variable transmission system increases. The duty ratio of the control signal supplied to the actuator increases, i.e., that the actuator is driven more rapidly as the gear ratio of the continuously variable transmission system increases. Accordingly, even when the gear ratio is in the top-ratio range and an amount of movement to the low-ratio range is large, the gear ratio can be returned steadily and reliably to the low-ratio range so that a sufficient acceleration is obtainable at the time of restart. In addition, since the actuator need not constantly be driven at a maximum duty ratio, power consumption can be reduced.

In another embodiment, the gear ratio control means includes an actuator having an output amount which changes based on a duty ratio of a control signal, and the duty ratio of the control signal supplied to the actuator is increased as a rotation-speed change rate of the driving pulley increases.

The duty ratio of the control signal supplied to the actuator increases, i.e., that the actuator is driven more rapidly as the rotation-speed change rate of the driving pulley increases. Accordingly, even when the rotation-speed change rate of the driving pulley is increased as a result of fully closing the throttle opening in the state in which a rear wheel brake is driven or fully closing the throttle opening during driving up a steep slope, the gear ratio can be returned steadily and reliably to the low-ratio range so that a sufficient acceleration is obtainable at the time of restart. In addition, since the actuator need not constantly be driven at a maximum duty ratio, power consumption can be reduced.

DETAILED DESCRIPTION

Figure 1:
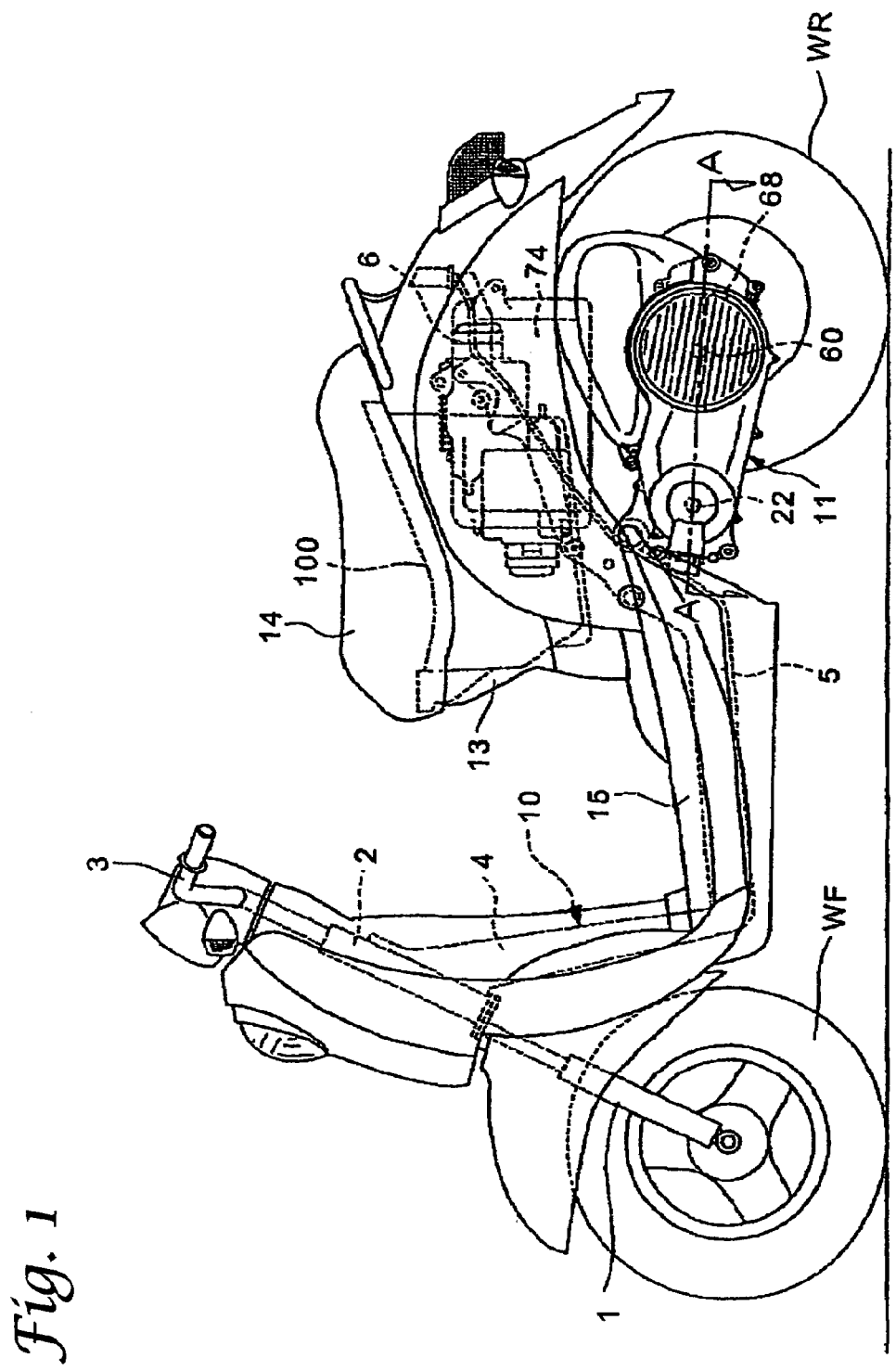
FIG. 1 is a side view showing a schematic structure of a hybrid vehicle to which the present invention can be applied.

Referring now to the drawings, FIG. 1 is a side view of an embodiment of a scooter-type hybrid vehicle to which the present invention can be applied.

The hybrid vehicle has a front fork 1 for rotatably supporting a front wheel WF forwardly of a body. The front fork 1 is pivoted on a head pipe 2 and can be steered by the operation of a handlebar 3. A down pipe 4 is attached to the head pipe 2 and extends rearwardly and downwardly therefrom. A middle frame 5 extends generally horizontally from the lower end of the down pipe 4. From the rear end of the middle frame 5, a rear frame 6 is further formed to extend rearwardly and upwardly therefrom.

The head pipe 2, down pipe 4, middle frame 5 and rear frame 6 form a body frame 10. One end of a power unit 11, including an engine as a power source and a drive motor, is pivotally attached to the body frame 10. The power unit 11 has a rear end as the other end thereof to which a rear driving wheel WR is rotatably attached and is suspended by a rear cushion (not shown) attached to the rear frame 6.

The body frame 10 has an outer circumferential portion thereof covered with a body cover 13. A seat 14 on which a rider is seated is fixed to the upper surface of the body cover 13 to extend rearwardly thereof. A step floor 15 on which the rider rests his or her feet is formed forwardly of the seat 14. A storage box 100 functioning as a utility space for storing a helmet, luggage, and the like is provided under the seat 14. A battery 74 is contained in the body cover 13 rearwardly of the storage box 100. Reference numeral 22 denotes the axial position of the crankshaft of the engine, numeral 60 denotes the axial position of a drive shaft, and numeral 68 denotes the axial position of the axle of the rear wheel WR.

Figure 2:
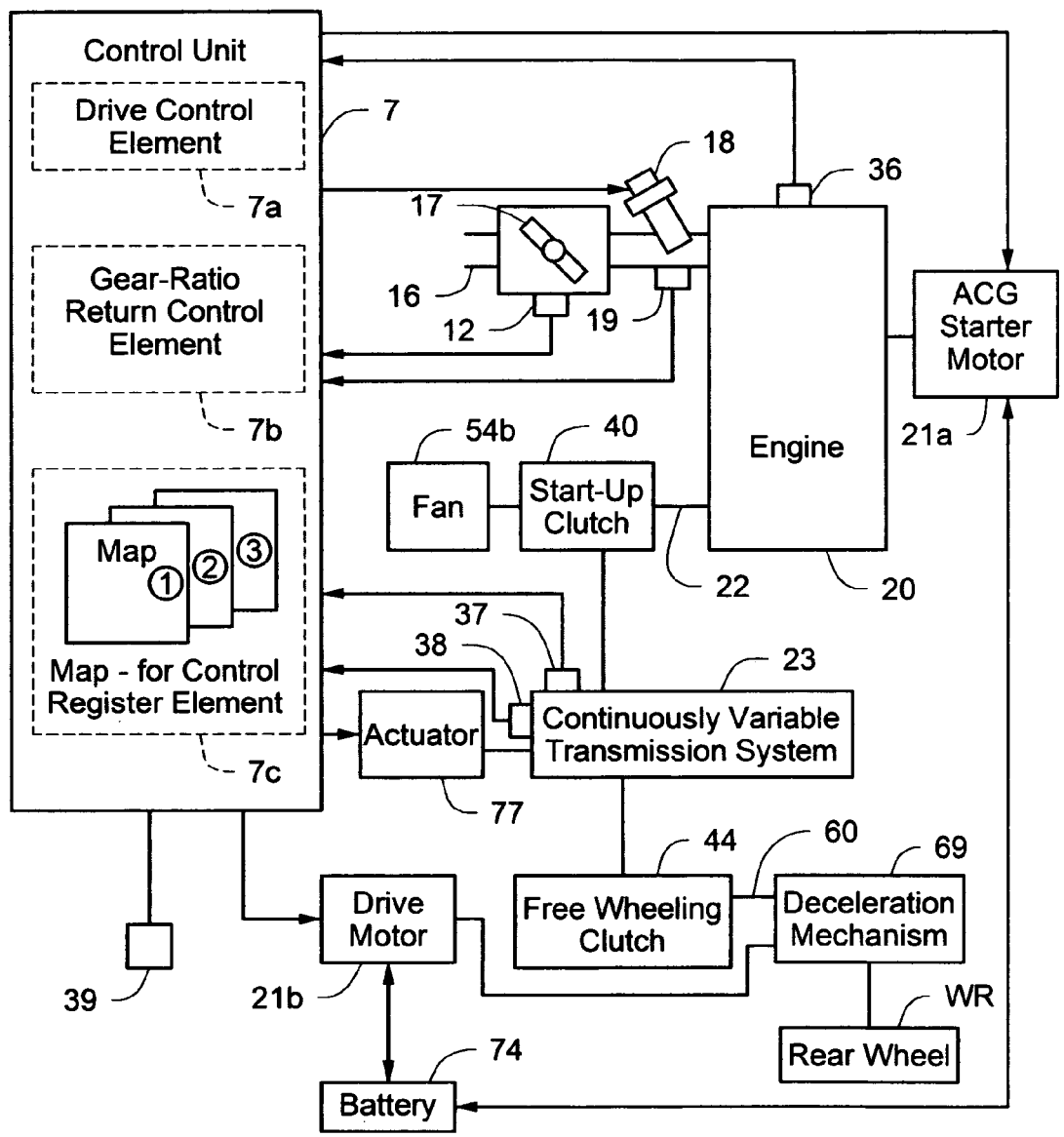
FIG. 2 is a block diagram showing the system structure of the hybrid vehicle shown in FIG. 1.

FIG. 2 is a block diagram showing the system structure of the hybrid vehicle described above. The power unit 11 comprises: an engine 20; an ACG starter motor 21a functioning as an engine starter and a power generator; a continuously variable transmission system 23 coupled to the crankshaft 22 to transmit the power of the engine 20 to the rear wheel WR; an actuator 77 (e.g., a transmission motor) included in gear ratio control means for the gear transmission of the continuously variable transmission system 23; a start-up clutch 40 for connecting or disconnecting power transmission between the crankshaft 22 and the continuously variable transmission system 23; a free wheeling clutch 44 which transmits power from the engine 20 and a drive motor 21b toward the rear wheel WR but does not transmit power from the rear wheel WR toward the engine 20; the drive motor 21b functioning as a motor or a power generator; and a deceleration mechanism 69 which decelerates the output of the continuously variable transmission system 23 and transmits the decelerated output to the rear wheel WR.

With continued reference to FIG. 2, the number of revolutions Ne of the engine 20 is sensed by an engine number-of-revolution sensor 36. The continuously variable transmission system 23 is provided with a gear ratio sensor 37 as gear ratio detecting means for detecting a gear ratio Rm and with a pulley number-of-revolution sensor 38 as pulley number-of-revolution detecting means for detecting the number of revolutions Np of a driving pulley 58. Reference numeral 39 denotes a vehicle speed sensor for detecting a vehicle speed vb, which is provided at an arbitrary position.

In FIG. 2, the power from the engine 20 is transmitted to the rear wheel WR via the crankshaft 22, the start-up clutch 40, the continuously variable transmission system 23, the free wheeling clutch 44, a drive shaft 60, and the deceleration mechanism 69. On the other hand, the power from the drive motor 21b is transmitted to the rear wheel WR via the drive shaft 60 and the deceleration mechanism 69. Thus, according to the present embodiment, the drive shaft 60 serves as the output shaft of the engine 20 and also as the output shaft of the drive motor 21b. To the left end portion in the vehicle width direction of the crankshaft 22, a fan 54b is connected via the start-up clutch 40 to cool the continuously variable transmission system 23.

A battery 74 is connected to the ACG starter motor 21a and to the drive motor 21b. The battery 74 is configured to supply power to the motors 21a and 21b when the drive motor 21b functions as a motor and when the ACG starter motor 21a functions as a starter, while it is configured to be charged, when each of the motors 21a and 21b functions as a power generator, with the regenerative powers thereof.

As illustrated in FIG. 2, in a suction pipe 16 of the engine 20, a throttle valve 17 is rotatably mounted to control an amount of air provided to the engine. The throttle valve 17 is rotated in accordance with an amount of operation of a throttle grip (not shown) operated by the rider. Although the present embodiment illustrates a throttle opening sensor 12 as a throttle opening detecting means in the throttle valve 17, the throttle opening sensor 12 may also be provided in the throttle grip, in a wire coupling the throttle grip to the throttle valve 17, or the like. Between the throttle valve 17 and the engine 20, an injector 18 for spraying a fuel and a negative pressure sensor 19 which detects a negative pressure in the suction pipe are arranged. It is also possible to mount a DBW (Drive-By-Wire) system which performs automatic control based on the number of revolutions of the engine, the vehicle speed, or the like without regard to the operation of the rider.

A drive control element 7a is provided in a control unit 7 that includes the actuator 77. The drive control element 7a forms gear ratio control means that outputs a gear ratio control signal to the actuator 77 during normal driving based on output signals from the throttle opening sensor 12, the engine number-of-revolution sensor 36, the vehicle speed sensor 39, and the like. The drive control element 7a also outputs an engine stop control signal to stop the engine when the opening of the throttle detected by the throttle opening sensor 12 has become a specified value or less so that a deceleration state is entered.

Upon detection of the engine stop signal from the drive control element 7a, a gear-ratio return control element 7b of the control unit 7 determines the gear ratio Rm of the continuously variable transmission system 23 based on the signal from the gear ratio sensor 37. If the gear ratio Rm has not entered a specified low gear-ratio state, the gear-ratio return control element 7b outputs to the actuator 77 a gear ratio control signal for returning the driving pulley 58 toward the low-ratio range.

A map-for-control register element 7c of the control unit 7 has the control maps of control instructions given by the gear-ratio return control element 7b to the actuator 77 that have been registered therein.

Figure 3:
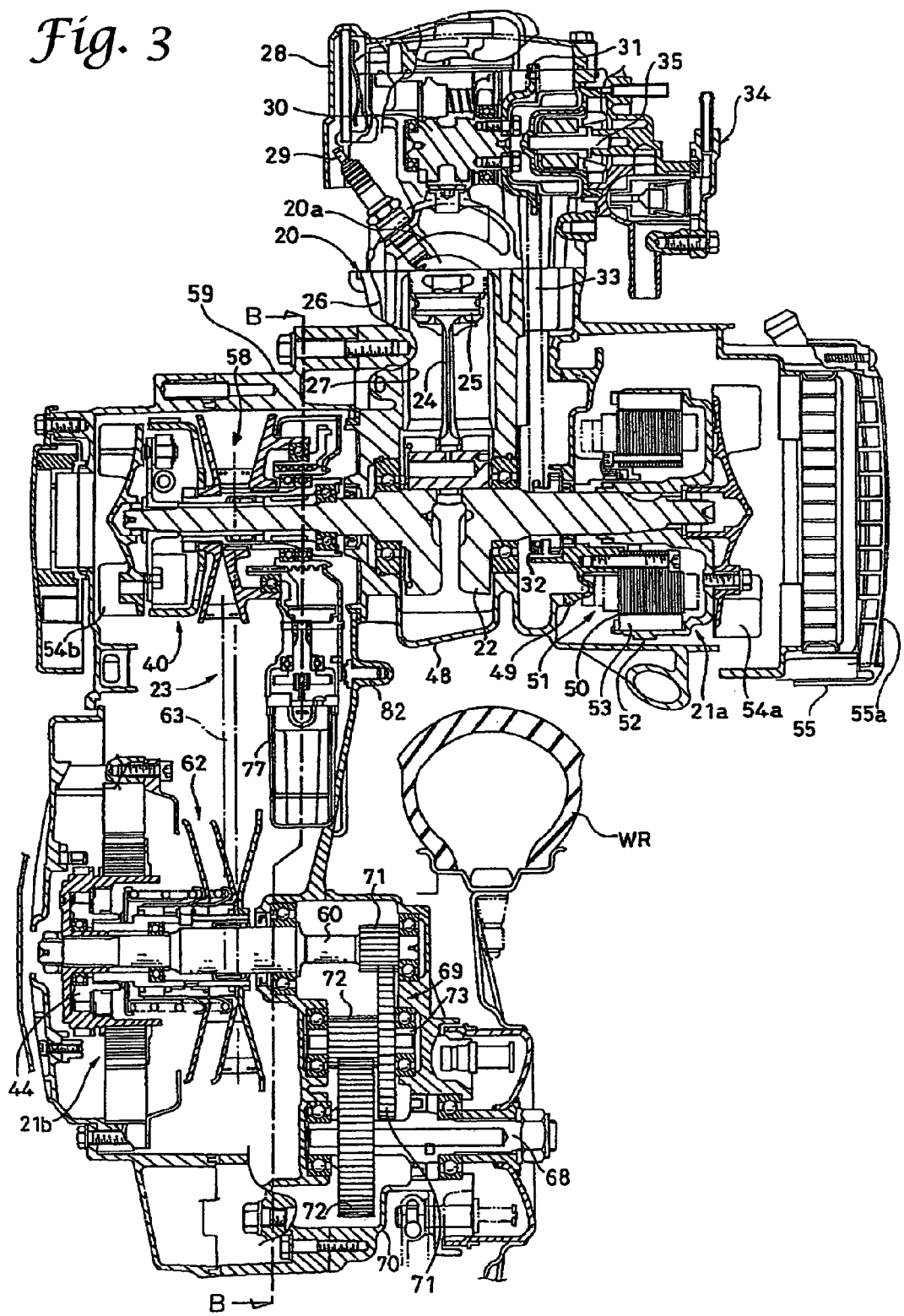
FIG. 3 is a cross-sectional view of the power unit of the hybrid vehicle shown in FIG. 1, which is taken along the line A-A thereof.

With reference now to FIG. 3, which is a cross-sectional view taken along the line A-A of FIG. 1, the structure of the power unit 11 including the engine 20 and the drive motor 21b will now be described.

The engine 20 comprises a piston 25 coupled to the crankshaft 22 via a rod 24. The piston 25 is slidable in a cylinder 27 provided in a cylinder block 26. The cylinder block 26 is disposed such that the axis of the cylinder 27 is generally horizontal. A cylinder head 28 is fixed to the front surface of the cylinder block 26. A combustion chamber 20a for the combustion of a gas mixture is formed by the cylinder head 28, the cylinder 27, and the piston 25.

In the cylinder head 28, there are disposed a valve (not shown) for controlling the suction of the gas mixture into the combustion chamber 20a or exhaust therefrom and an ignition plug 29 for the ignition of the compressed gas mixture. The opening/closing of the valve is controlled by the rotation of a cam shaft 30 rotatably supported on the cylinder head 28. The cam shaft 30 has a driven sprocket 31 on one end thereof and an endless cam chain 33 is wound between the driven sprocket 31 and a driving sprocket 32 provided on one end of the crankshaft 22. The cam shaft 30 has one end provided with a water pump 34 for cooling the engine 20. The water pump 34 has a rotation shaft 35 thereof integrally rotating with the cam shaft 30. Accordingly, when the cam shaft 30 rotates, the water pump 34 can be operated.

A stator case 49 is coupled to the right side (in the vehicle width direction) of a crankcase 48 which rotatably supports the crankshaft 22. The ACG starter motor 21a is a so-called outer-rotor-type motor and the stator thereof is composed of a coil 51 obtained by winding a conductor wire around a teeth 50 fixed to the stator case 49. On the other hand, the outer rotor 52 is fixed to the crankshaft 22 and has a generally cylindrical configuration covering the outer circumferential portion of the stator. A magnet 53 is disposed on the inner circumferential surface of the outer rotor 52.

A fan 54a for cooling the ACG starter motor 21a is attached to the outer rotor 52. When the fan 54a rotates in synchronization with the crankshaft 22, air for cooling is supplied from a cooling air inlet formed in the side surface 55a of the cover 55 of the stator case 49.

A power transmission case 59 is coupled to the left side (in the vehicle width direction) of the crankcase 48. In the power transmission case 59, there are contained the fan 54b fixed to the left end portion of the crankshaft 22, the continuously variable transmission system 23 having a driving side thereof coupled to the crankshaft 22 via the start-up clutch 40, and the drive motor 21b coupled to the driven side of the continuously variable transmission system 23. The fan 54b is for cooling the continuously variable transmission system 23 and the drive motor 21b contained in the power transmission case 59 and is disposed on the same side as the drive motor 21b relative to the continuously variable transmission system 23, i.e., on the left side in the vehicle width direction in the present embodiment, similarly to the drive motor 21b.

The front and left sides of the power transmission case 59 (from the viewpoint of the body 10) are formed with a cooling air inlet. When the fan 54b rotates in synchronization with the crankshaft 22, outside air is supplied into the power transmission case 59 from the cooling air inlet located in the vicinity of the fan 54b to forcibly cool the drive motor 21b and the continuously variable transmission system 23.

The continuously variable transmission system 23 is a belt converter composed of an endless V-belt (endless belt) 63 which is wound between the driving pulley 58 attached via the start-up clutch 40 to the left end portion of the crankshaft 22 protruding in the vehicle width direction from the crankcase 48 and the driven pulley 62 attached via the free wheeling clutch 44 to the drive shaft 60 rotatably supported by the power transmission case 59 to have an axis parallel with the crankshaft 22. In the present embodiment, the actuator 77 for changing the gear ratio is provided in the vicinity of the driving pulley 58. The deceleration mechanism 69 and the components subsequent thereto will be described later.

Figure 4:
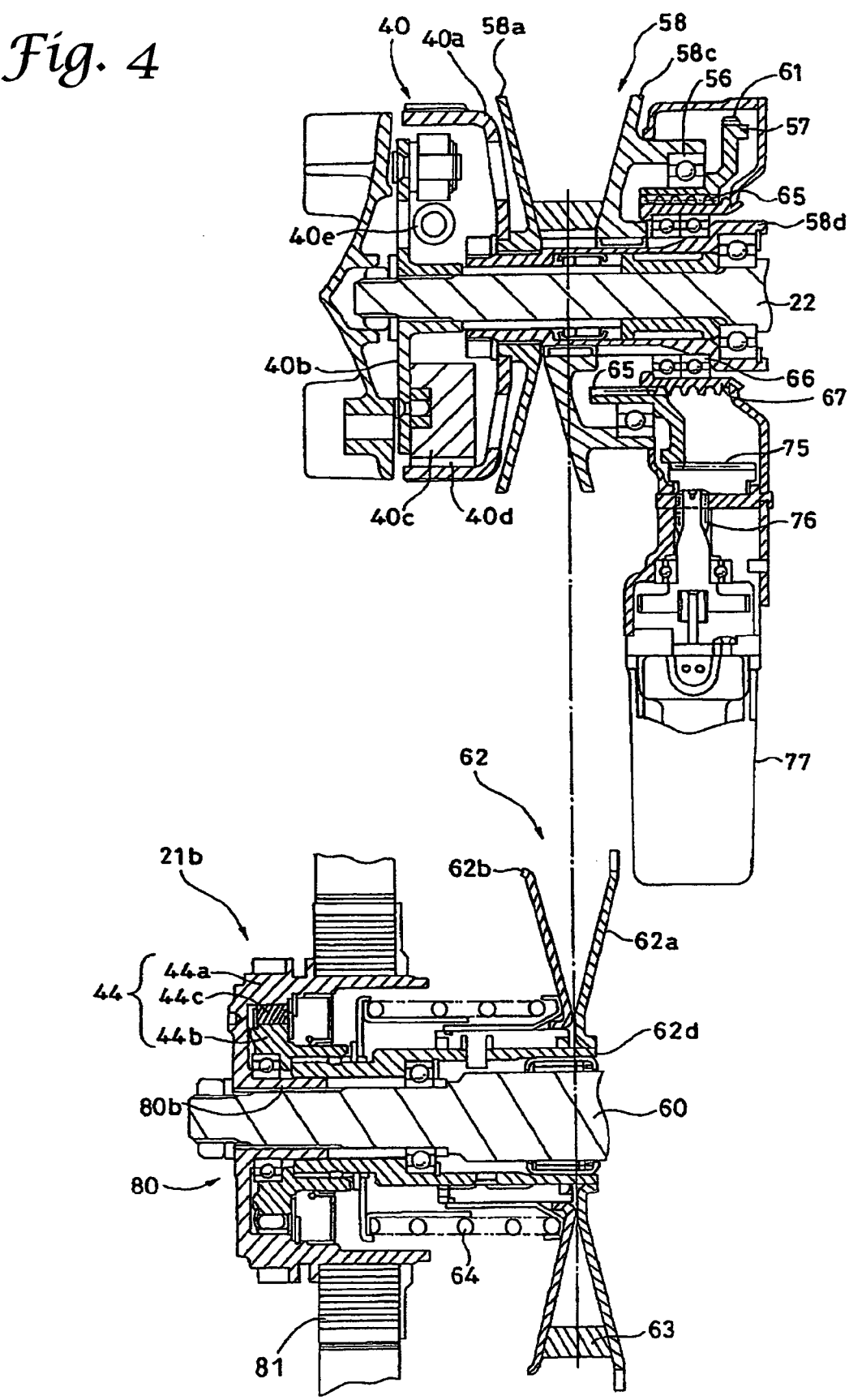
FIG. 4 is an enlarged view of the principal portion of a continuously variable transmission system in FIG. 3.

FIG. 4 is an enlarged view of the principal portion of the continuously variable transmission system 23. The driving pulley 58 is attached to the crankshaft 22 via a sleeve 58d to be rotatable in the circumferential direction thereof. The driving pulley 58 comprises a driving-pulley fixed half part 58a fixed onto the sleeve 58d and a driving-pulley movable half part 58c attached to the sleeve 58d to be slidable in the axial direction thereof but unrotatable in the circumferential direction thereof. To the driving-pulley movable half part 58c, a transmission ring 57 is rotatably attached via a bearing 56.

The transmission ring 57 has a large-diameter outer circumferential portion thereof formed with a gear 61 along the circumferential direction thereof, while having an inner circumferential portion thereof formed with a trapezoidal screw 65 along the axial direction thereof. The trapezoidal screw 65 has a meshing engagement with a trapezoidal screw 67 attached to the sleeve 58d via a bearing 66 to be rotatable in the circumferential direction thereof but unslidable in the axial direction thereof. The trapezoidal screw 67 is attached unrotatably to the power transmission case 59 via a pin 82 for stopping rotation. A worm wheel 75 has a meshing engagement with the gear 61 of the transmission ring 57. In addition, a worm gear 76 coupled to the rotation shaft of the actuator 77 for controlling the gear ratio has a meshing engagement with the worm wheel 75.

On the other hand, the driven pulley 62 has a driven-pulley fixed half part 62a mounted on the drive shaft 60 via the sleeve 62d to have a slidable motion thereof restricted in the axial direction thereof but to be rotatable in the circumferential direction thereof, and a driven-pulley movable half part 62b mounted on the sleeve 62d to be slidable in the axial direction thereof. The endless V-belt 63 is wound in and around the belt grooves each having a generally V-shaped configuration and formed between the driving-pulley fixed half part 58a and the driving-pulley movable half part 58c and between the driven-pulley fixed half part 62a and the driven-pulley movable half part 62b.

On the back side (the left side in the vehicle width direction) surface of the driven-pulley movable half part 62b, a resilient member 64, for example a spring, is disposed to constantly bias the driven-pulley movable half part 62b toward the driven-pulley fixed half part 62a.

The changing of the gear ratio of the continuously variable transmission system 23 is performed by driving the actuator 77 in the direction corresponding to the shifting up/down of the gear ratio. The driving force of the actuator 77 is transmitted to the gear 61 of the transmission ring 57 via the worm gear 76 and the worm wheel 75 to rotate the transmission ring 57. Since the transmission ring 57 has a meshing engagement with the sleeve 58d via the trapezoidal screws 65 and 67, it moves leftward in FIG. 4 over the crankshaft 22 when the direction of rotation of the transmission ring 57 is a shift-up direction (top-ratio direction). With the movement of the transmission ring 57, the driving-pulley movable half part 58c slides in a direction in which it approaches the driving-pulley fixed half part 58a. Since the driving-pulley movable half part 58c approaches the driving-pulley fixed half part 58a by a distance corresponding to the sliding motion and the groove width of the driving pulley 58 is reduced accordingly, the contact position between the driving pulley 58 and the V-belt 63 shifts outwardly in the radial direction of the driving pulley 58 so that the winding diameter of the V-belt 63 is increased.

In FIG. 4, the low-ratio position is shown above the crankshaft 22 and the top-ratio position is shown below the crankshaft 22. In response to this movement, a force to reduce the winding diameter acts on the driven pulley 62 because the distance between the crankshaft 22 and the drive shaft 60 is invariable and the V-belt 63 has an endless configuration. Consequently, the driven-pulley movable half part 62b slides leftward in FIG. 4 against a resilient force resulting from biasing by the spring 64 so that the groove width formed by the driven-pulley fixed half part 62a and the driven-pulley movable half part 62b increases. Thus, the continuous changing of the gear ratio is implemented by the continuous changing of the winding diameter (i.e. the transmission pitch diameter) of the V-belt 63.

The start-up clutch 40 is composed of a cup-shaped outer case 40a fixed to the sleeve 58d, an outer plate 40b fixed to the left end portion of the crankshaft 22, a shoe 40d attached to the outer circumferential portion of the outer plate 40b via a weight 40c to face outward in the radial direction, and a spring 40e for biasing the shoe 40d inward in the radial direction.

When the number of revolutions of the engine, i.e., the number of revolutions of the crankshaft 22, is not more than a specified value (e.g., 3000 rpm), power transmission between the crankshaft 22 and the continuously variable transmission system 23 is interrupted by the start-up clutch 40. When the number of revolutions of the engine increases and the number of revolutions of the crankshaft 22 exceeds the specified value, a centrifugal force acting on the weight 40c counteracts the resilient force exerted inward in the radial direction by the spring 40e and the weight 40c moves outward in the radial direction so that the shoe 40d is pressed onto the inner circumferential surface of the outer case 40a under a force not less than the specified value. As a result, the rotation of the crankshaft 22 is transmitted to the sleeve 58d via the outer case 40a to drive the driving pulley 58 fixed to the sleeve 58d.

The driven free wheeling clutch 44 comprises a cup-shaped outer clutch 44a, an inner clutch 44b coaxially inserted in the outer clutch 44a, and a roller 44c which allows power transmission only in one direction from the inner clutch 44b to the outer clutch 44a. The outer clutch 44a also serves as the main body of the inner rotor of the drive motor 21b and is composed of the same member forming the main body of the inner rotor.

The power from the engine 20 transmitted to the driven pulley 62 of the continuously variable transmission system 23 is transmitted to the rear wheel WR via the driven-pulley fixed half part 62a, the inner clutch 44b, the outer clutch 44a, i.e., the main body of the inner rotor, the drive shaft 60, and the deceleration mechanism 69. On the other hand, the power from the rear wheel WR during the walking of the vehicle or the like is transmitted to the deceleration mechanism 69, to the drive shaft 60, and to the main body of the inner rotor, i.e., the outer clutch 44a. But, because the outer clutch 44a freewheels relative to the inner clutch 44b, the power from the rear wheel WR is prevented from being transmitted to the continuously variable transmission system 23 and to the engine 20. In addition, during driving using the drive motor 21b as the power source, the power from the drive motor 21b is also prevented from being transmitted to the continuously variable transmission system 23 and to the engine 20 in the same manner as described above.

The drive motor 21b includes an inner rotor 80 that comprises the drive shaft 60 which also serves as the output shaft of the continuously variable transmission system 23 and the main body of the inner rotor, i.e., the outer clutch 44a which is shaped like a cup and spline-coupled to the drive shaft 60 at a boss portion 80b formed in the center portion thereof. A coil 81 is disposed on the outer circumferential surface of the outer clutch 44a to be closer to the opening thereof.

Referring back to FIG. 3, the deceleration mechanism 69 and the components subsequent thereto will be described. The deceleration mechanism 69 is provided in a power transmission chamber 70 connected to the right side of the rear end portion of the power transmission case 59. The deceleration mechanism 69 includes a middle shaft 73 rotatably supported to be parallel with the drive shaft 60 and the axle 68 of the rear wheel WR, a first pair of deceleration gears 71 disposed at the right end portion of the drive shaft 60 and at the center portion of the middle shaft 73, respectively, and a second pair of deceleration gears 72 disposed at the respective left end portions of the middle shaft 73 and the axel 68. By the structure described above, the rotation of the drive shaft 60 is decelerated at a specified deceleration ratio and transmitted to the axle 68 of the rear wheel WR.

Figure 5:
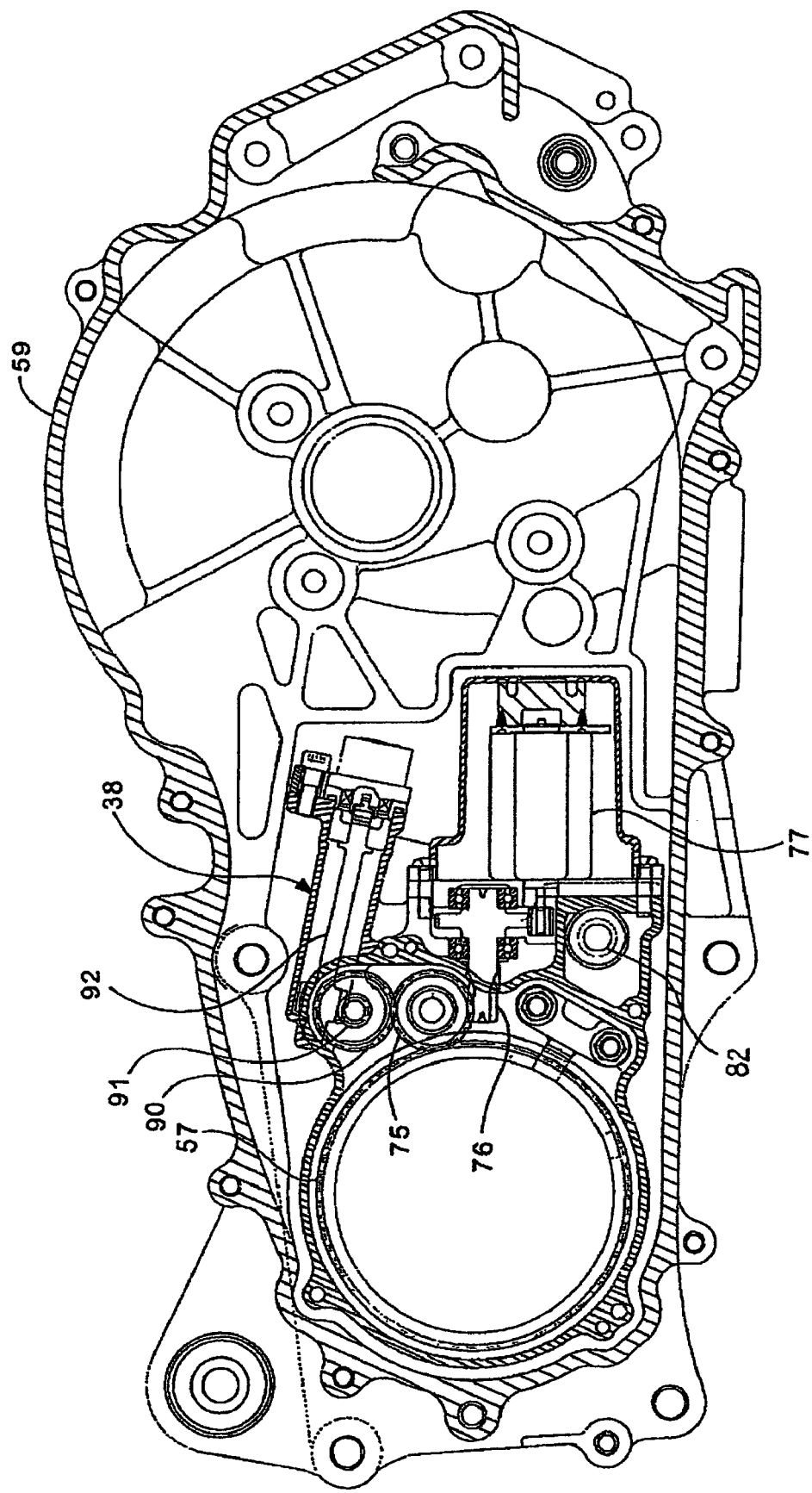
FIG. 5 is a partial side/cross-sectional view taken along the line B-B of FIG. 3.

FIG. 5 is a partial side/cross-sectional view taken along the line B-B of FIG. 3. When the gear ratio of the continuously variable transmission system 23 is changed, the actuator 77 provided in the power transmission chamber 70 is driven and the driving force is transmitted to the transmission ring 57 via the worm gear 76 and the worm wheel 75. On the other hand, the driving force transmitted to the worm wheel 75 is transmitted to a sensor rod 92 in the gear ratio sensor 38 by a worm wheel 90 and a worm gear 91 coaxial thereto. The gear ratio sensor 38 in the present embodiment is a position sensor which detects the amount of rotation of the transmission ring 57 and is composed of, e.g., a potentiometer or the like. The gear ratio sensor 38 may also be composed of a magnetic sensor which performs measurement in a non-contact manner or the like.

The procedure of gear-ratio return control according to the present embodiment in the hybrid vehicle composed of the structure described above will now be described. When the engine starts, the crankshaft 22 is rotated by using the ACG starter motor 21a on the crankshaft 22. At this time, the start-up clutch 40 is not connected so that power transmission from the crankshaft 22 to the continuously variable transmission system 23 is interrupted. When the throttle opening Tp becomes larger to increase the number of revolutions Np of the engine and the number of revolutions of the crankshaft 22 exceeds a specified value (e.g., 3000 rpm), the rotating power of the crankshaft 22 is transmitted to the continuously variable transmission system 23 via the start-up clutch 40 and inputted to the free wheeling clutch 44. The driving force inputted to the free wheeling clutch 44 rotates the rear wheel WR via the deceleration mechanism 69 and drives the vehicle.

The drive control element 7a (see FIG. 2) of the control unit 7 determines the gear ratio Rm in accordance with the throttle opening Tp based on the signal from the throttle opening sensor 12, the engine number of revolutions Ne based on the signal from the engine number-of-revolution sensor 36, and the vehicle speed vb based on the signal from the vehicle speed sensor 39 and drives the actuator 77. During normal driving, the driving-pulley movable half part 58c and the driven-pulley movable half part 62b in the continuously variable gear ratio 23 move successively to the positions in the top-ratio range with the increase of the vehicle speed Vb.

Figure 6:
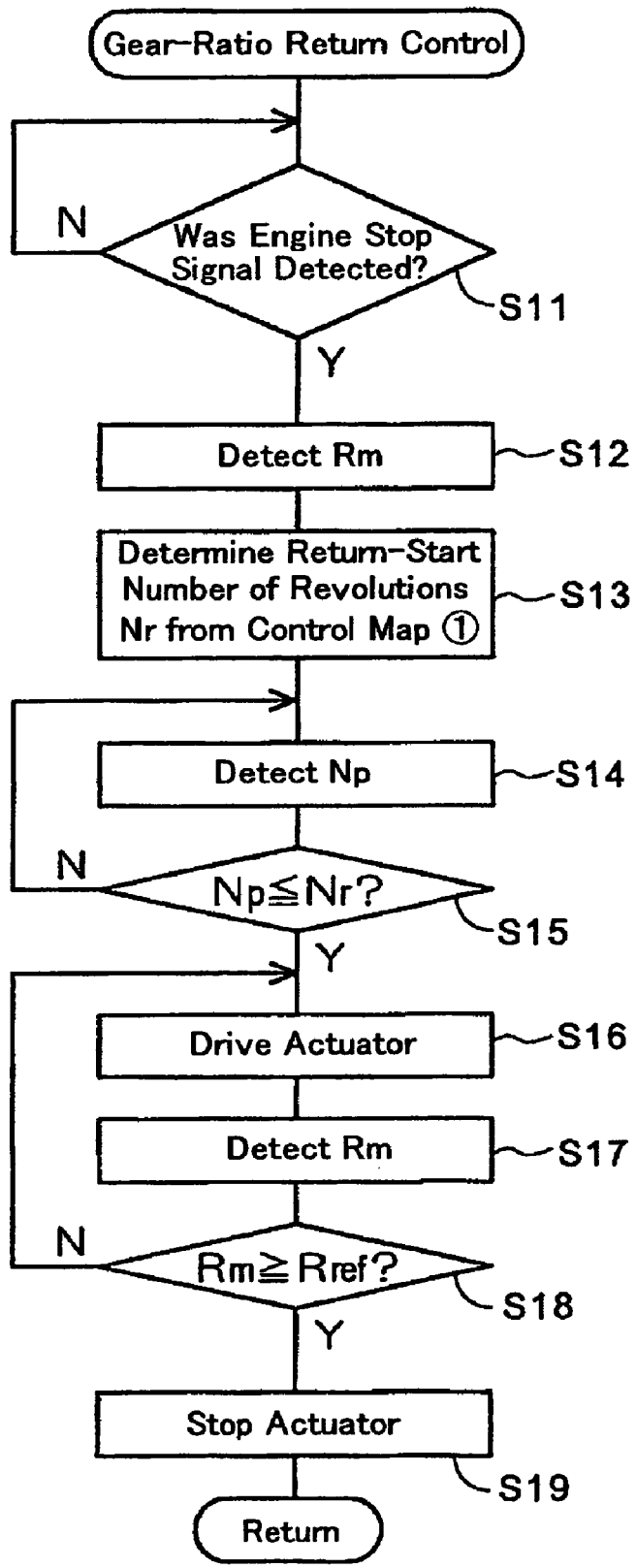
FIG. 6 is a flow chart illustrating the procedure of gear-ratio return control according to a first embodiment of the present invention.

FIG. 6 is a flow chart illustrating the procedure of gear-ratio return control using the control unit 7 of FIG. 2 according to a first embodiment of the present invention. The procedure is repeatedly executed in a specified cycle. Since the present embodiment uses the gear ratio/return-start number of revolutions map of FIG. 7, a description of the map will be given first.

Figure 7:
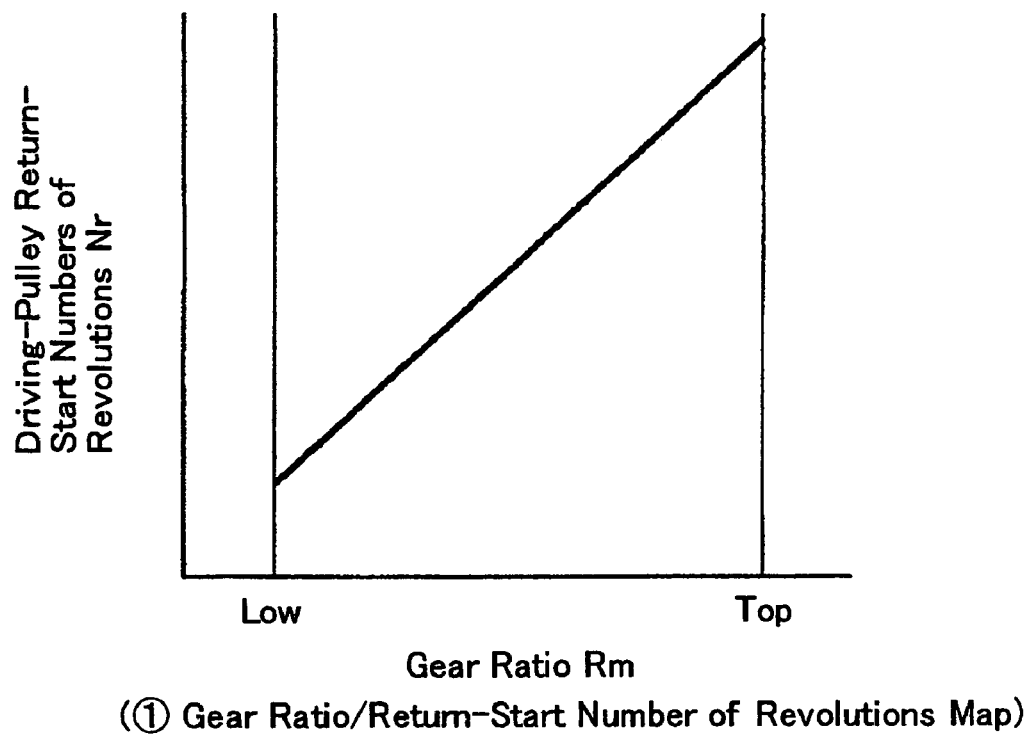
FIG. 7 is a map showing control information according to the first embodiment of the present invention.

The abscissa axis of FIG. 7 represents the gear ratio (Rm) and the ordinate thereof represents the return-start number of revolutions (Nr) of the driving pulley, which is set in association with the gear ratio (Rm) at the time of engine stop.

In Step S11 of FIG. 6, it is judged whether or not the drive control element 7a has issued an engine stop instruction based on the signal from the throttle opening sensor 12. If it is judged that the drive control element 7a has issued the engine stop instruction, the whole process flow advances to Step S12. In Step S12, the gear ratio Rm at the time of engine stop is detected based on the signal from the gear ratio sensor 38. In Step S13, the return-start number of revolutions Nr of the driving pulley is determined from the gear ratio/return-start number of revolutions map (FIG. 7) that has been registered in the control map register element 7c. In Step S14, the number of revolutions Np of the driving pulley is detected based on the signal from the pulley number-of-revolution sensor 37. Subsequently, in Step S15, a comparison is made between the return-start number of revolutions Nr determined above in Step S13 and the pulley number of revolutions Np detected above in Step S14 to judge whether or not the pulley number of revolutions Np is equal to or less than the return-start number of revolutions Nr. If the pulley number of revolutions Np is judged to be equal to or less than the return-start number of revolutions Nr, the whole process flow advances to Step S16 where the actuator 77 is driven.

In general, the number of revolutions Np of the driving pulley or the rotating state of the driving pulley at the time of engine stop depends not only on the speed of the vehicle but also on driving conditions including a hill-climb road and loadage. However, the provision of Steps S14 and S15 described above enables the actuator to be driven when the number of revolutions of the driving pulley reaches a given number of revolutions Nr regardless of the driving conditions. In other words, by rendering an actuator drive start time (gear-ratio control start time) variable depending on the gear ratio of the driving pulley or the rotating state thereof at the time of engine stop, it becomes possible to drive the actuator starting from the same state (i.e., the given number of revolutions Nr) regardless of the driving conditions. This achieves stable control.

In Step S17, the gear ratio Rm is detected again and compared with a reference gear ratio Rref in Step S18. If it is judged that the gear ratio Rm is larger than the value of the reference gear ratio (i.e. that the gear ratio is closer to the low-ratio range than the reference gear ratio), the whole process flow advances to Step S19 where the actuator 77 is stopped.

In the present embodiment, the driving of the actuator is started at a point where the number of revolutions of the driving pulley is higher as the gear ratio Rm is closer to the top-ratio range. Accordingly, even after the engine has stopped with the gear ratio being in the top-ratio range (i.e. in the state in which the amount of movement of the driving-pulley movable half part 58c to the low-ratio range is large), the gear ratio can be returned rapidly, steadily, and reliably to the low-ratio range so that a sufficient acceleration is obtainable at the time of restart.

Figure 8:
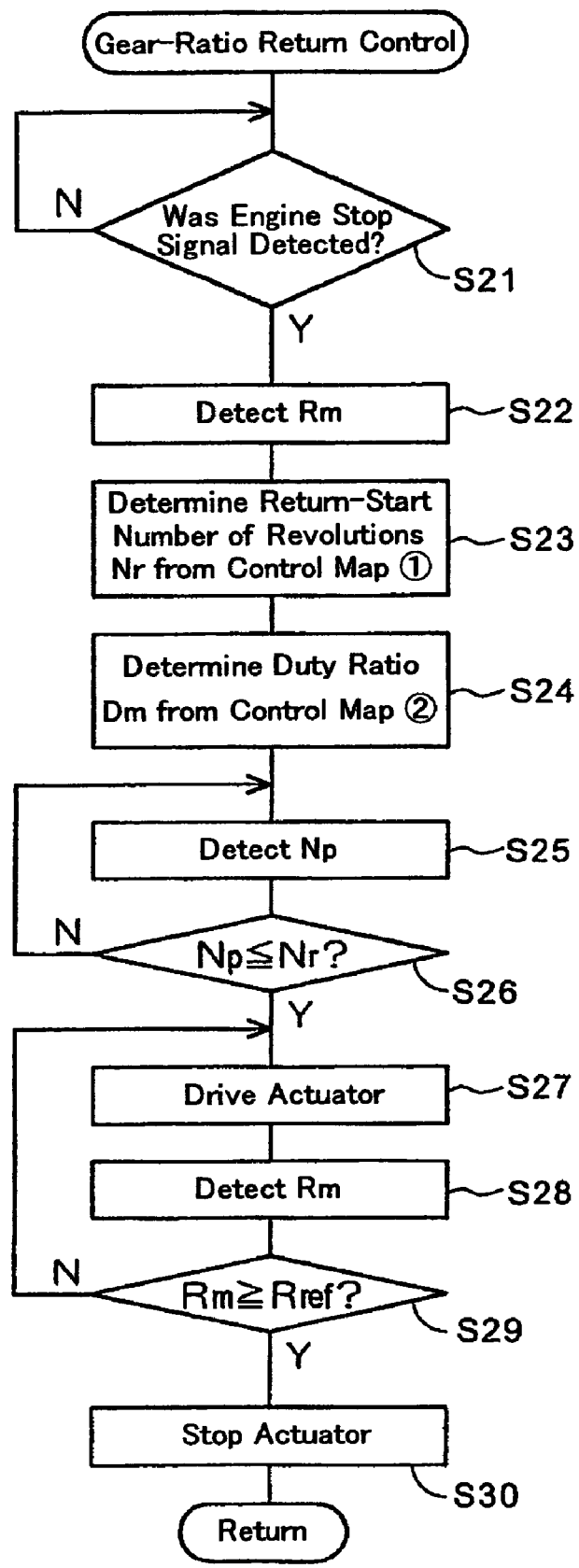
FIG. 8 is a flow chart illustrating the procedure of gear-ratio return control according to a second embodiment of the present invention.

FIG. 8 is a flow chart illustrating the procedure of gear-ratio return control using the control unit 7 of FIG. 2 according to a second embodiment of the present invention, which is repeatedly executed in a specified cycle.

Figure 9:
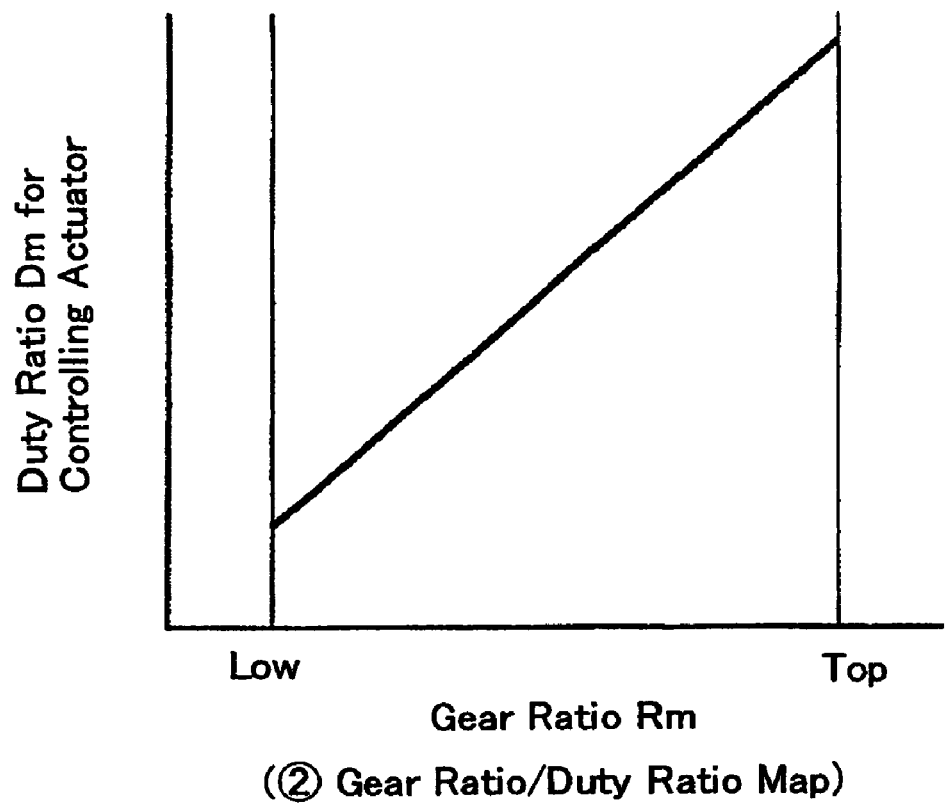
FIG. 9 is a map showing control information according to the second embodiment of the present invention.

A description will be given to the gear ratio/duty ratio map of FIG. 9 used in the description of FIG. 8. The abscissa of FIG. 9 represents the gear ratio (Rm) and the ordinate thereof represents a duty ratio (D) for controlling the actuator. The map shows the duty ratio (Dm) for controlling the actuator upon starting the returning of the driving pulley, which is set in association with the gear ratio (Rm) at the time of engine stop.

In Step S21 of FIG. 8, it is judged whether or not the drive control element 7a has issued an engine stop instruction based on the signal from the throttle opening sensor 12. If it is judged that the drive control element 7a has issued the engine stop instruction, the whole process flow advances to Step S22. In Step S22, the gear ratio Rm at the time of engine stop is detected based on the signal from the gear ratio sensor 38. In Step S23, the return-start number of revolutions Nr of the driving pulley is determined from the gear ratio/return-start number of revolutions map (see FIG. 7) that has been registered in the control map register element 7c. In Step S24, the duty ratio Dm of the actuator 77 is determined from the gear ratio/duty ratio map (see FIG. 9) that has been registered in the control map register element 7c. In Step S25, the number of revolutions Np of the driving pulley is detected based on the signal from the pulley number-of-revolution sensor 37. In Step S26, a comparison is made between the return-start number of revolutions Nr determined above in Step S23 and the pulley number of revolutions Np detected above in Step S25 to judge whether or not the pulley number of revolutions Np is equal to or less than the return-start number of revolutions Nr. If the pulley number of revolutions Np is judged to be equal to or less than the return-start number of revolutions Nr, the whole process flow advances to Step S27 where the actuator 77 is driven at the duty ratio Dm determined above in Step S24. In Step S28, the gear ratio Rm is detected again and compared with the reference gear ratio Rref in Step S29. If it is judged that the gear ratio Rm is equal to or more than the value of the reference gear ratio (i.e. that the gear ratio is closer to the low-ratio range than the reference gear ratio), the whole process flow advances to Step S30 where the actuator 77 is stopped.

In the present embodiment, the provision of Steps S25 and S26 achieves the same effects as achieved by Steps S14 and S15 of the first embodiment. In addition, since the driving of the actuator is started at a point where the number of revolutions of the driving pulley is higher as the gear ratio Rm is closer to the top-ratio range and an instruction to use a high duty ratio is given to the actuator, i.e., the actuator is driven rapidly, even after the engine has stopped, and the gear ratio can be returned steadily and reliably to the low-ratio range. This makes it possible to obtain a sufficient acceleration at the time of restart. In addition, since the actuator need not constantly be driven at a maximum duty ratio, power consumption can be reduced.

Figure 10:
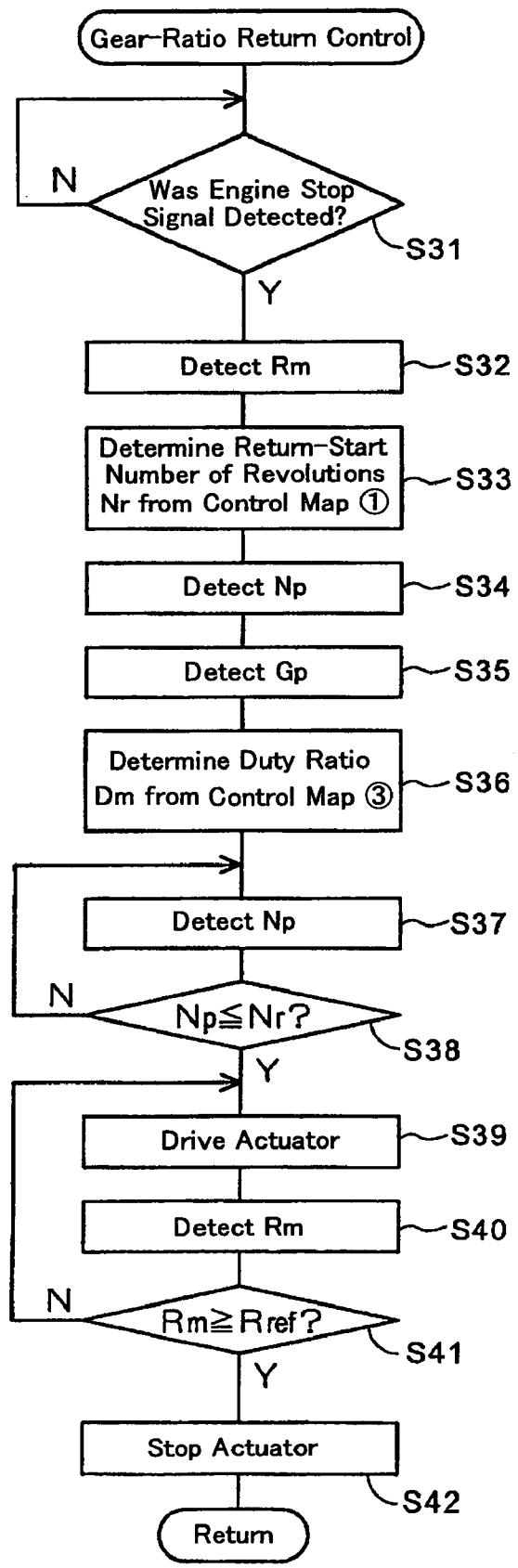
FIG. 10 is a flow chart illustrating the procedure of gear-ratio return control according to a third embodiment of the present invention.

FIG. 10 is a flow chart illustrating the procedure of gear-ratio return control using the control unit 7 of FIG. 2 according to a third embodiment of the present invention, which is repeatedly executed in a specified cycle.

Figure 11:
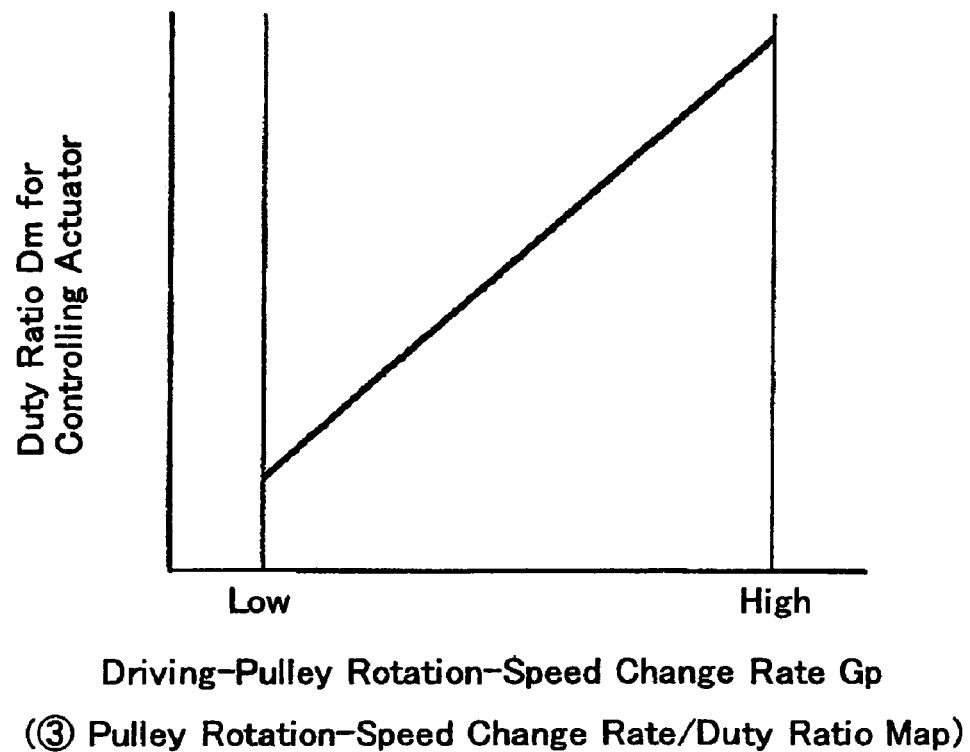
FIG. 11 is a map showing control information according to the third embodiment of the present invention.

A description will be given to the pulley rotation-speed change rate/duty ratio map of FIG. 11 used in the description of FIG. 10. The abscissa of FIG. 11 represents the rotation-speed change rate (Gp) of the driving pulley and the ordinate thereof represents a duty ratio (D) for controlling the actuator. The map shows the duty ratio (Dm) for controlling the actuator upon starting the returning of the driving pulley, which is set in association with the rotation-speed change rate of the driving pulley at the time of engine stop.

In Step S31 of FIG. 10, it is judged whether or not the drive control element 7a has issued an engine stop instruction based on the signal from the throttle opening sensor 12. If it is judged that the drive control element 7a has issued the engine stop instruction, the whole process flow advances to Step S32. In Step S32, the gear ratio Rm at the time of engine stop is detected based on the signal from the gear ratio sensor 38. In Step S33, the return-start number of revolutions Nr of the driving pulley is determined from the gear ratio/return-start number of revolutions map (see FIG. 7) that has been registered in the control map register element 7c. In Step S34, the number of revolutions Np of the driving pulley is detected based on the signal from the pulley number-of-revolution sensor 37. In Step S35, the pulley rotation-speed change rate Gp (deceleration) during the period of At seconds that has elapsed from the measurement of the pulley number of revolutions is detected. In Step S36, the duty ratio Dm of the actuator 77 is determined from the pulley rotation-speed change rate/duty ratio map (see FIG. 11) that has been registered in the control map register element 7c. In Step 37, the number of revolutions Np of the driving pulley is detected again. In Step S38, a comparison is made between the return-start number of revolutions Nr determined above in Step S33 and the pulley number of revolutions Np detected above in Step S37 to judge whether or not the pulley number of revolutions Np is equal to or less than the return-start number of revolutions Nr. If the pulley number of revolutions Np is judged to be equal to or less than the return-start number of revolutions Nr, the whole process flow advances to Step S39 where the actuator 77 is driven at the duty ratio Dm determined above in Step S36. In Step S40, the gear ratio Rm is detected again and compared with the reference gear ratio Rref in Step S41. If it is judged that the gear ratio Rm is larger than the value of the reference gear ratio (i.e. that the gear ratio is closer to the low-ratio range than the reference gear ratio), the whole process flow advances to Step S42 where the actuator 77 is stopped.

In the present embodiment, the provision of Steps S37 and S38 achieves the same effects as steps S14, S15, S25 and S26 described in the first and second embodiments. In addition, since the driving of the actuator is started at a point where the number of revolutions of the driving pulley is higher as the gear ratio Rn is closer to the top-ratio range and, as the pulley rotation-speed change rate Gp of the driving pulley is higher, an instruction to use a higher duty ratio is given to the actuator, i.e., the actuator is driven rapidly, even after the engine has stopped, the gear ratio can be returned steadily and reliably to the low-ratio range. The change rate of the rotation speed of the driving pulley becomes higher when the throttle opening is fully closed and in the state in which the rear wheel brake is driven or when the throttle opening is fully closed during driving up a steep slope. In this case also, it becomes possible to obtain a sufficient acceleration at the time of restart. In addition, since the actuator need not constantly be driven at a maximum duty ratio, power consumption can be reduced.

In the gear-ratio return control element 7b, the gear ratio/return-start number of revolutions map of FIG. 7, the gear ratio/duty ratio map of FIG. 9, and the pulley rotation-speed change rate/duty ratio map of FIG. 11 shown in the embodiments described above may be used either alone or in a combination different from that shown in any of the embodiments described above.

The invention claimed is:

1. A transmission controller for a continuously variable transmission system of a vehicle having an engine that includes a crankshaft and having a driving wheel, the transmission system including a motor, a driving pulley disposed on a side of the motor, a driven pulley for transmitting power to the driving wheel via a free wheeling clutch, a belt wound between said driving pulley and said driven pulley, a start-up clutch connected between said crankshaft of said engine and said driving pulley to transmit power from said crankshaft to said driving pulley when said crankshaft equals or exceeds a specified number of rotations, and gear ratio control means for changing a gear ratio by varying a groove width of said driving pulley, said transmission controller comprising:

gear ratio detecting means for detecting a gear ratio of said continuously variable transmission system; and pulley number-of-revolution detecting means for detecting the number of revolutions of said driving pulley, wherein said gear ratio control means varies a gear-ratio control start time based on at least one of said gear ratio and a rotating state of said driving pulley.

2. A transmission controller for a continuously variable transmission system according to claim 1, wherein said engine includes a throttle valve, and said transmission controller further comprises:

throttle opening detecting means for detecting a throttle opening of said throttle valve; and a drive control element for performing a control operation to stop said engine when said throttle opening becomes a specified value or less, wherein said gear ratio control means starts controlling the gear ratio when said engine is stopped by said drive control element.

3. A transmission controller for a continuously variable transmission system according to claim 1, wherein said gear ratio control means starts controlling the gear ratio at a point where the number of revolutions of said driving pulley equals or exceeds a reference number of revolutions that increases as the gear ratio of said continuously variable transmission system increases.

4. A transmission controller for a continuously variable transmission system according to claim 2, wherein said gear ratio control means starts controlling the gear ratio at a point where the number of revolutions of said driving pulley equals or exceeds a reference number of revolutions that increases as the gear ratio of said continuously variable transmission system increases.

5. A transmission controller for a continuously variable transmission system according to claim 1, wherein said gear ratio control means includes an actuator having an output amount which changes based on a duty ratio of a control signal, and the duty ratio of the control signal supplied to said actuator is increased as the gear ratio of said continuously variable transmission system increases.

6. A transmission controller for a continuously variable transmission system according to claim 2, wherein said gear ratio control means includes an actuator having an output amount which changes based on a duty ratio of a control signal, and the duty ratio of the control signal supplied to said actuator is increased as the gear ratio of said continuously variable transmission system increases.

7. A transmission controller for a continuously variable transmission system according to claim 1, wherein said gear ratio control means includes an actuator having an output amount which changes based on a duty ratio of a control signal, and the duty ratio of the control signal supplied to said actuator is increased as a rotation-speed change rate of said driving pulley increases.

8. A transmission controller for a continuously variable transmission system according to claim 2, wherein said gear ratio control means includes an actuator having an output amount which changes based on a duty ratio of a control signal, and the duty ratio of the control signal supplied to said actuator is increased as a rotation-speed change rate of said driving pulley increases.

9. A transmission controller for a continuously variable transmission system of a vehicle having an engine that includes a crankshaft and having a driving wheel, the transmission system including a motor, a driving pulley disposed on a side of the motor, a driven pulley for transmitting power to the driving wheel via a free wheeling clutch, a belt wound between said driving pulley and said driven pulley, a start-up clutch connected between said crankshaft of said engine and said driving pulley to transmit power from said crankshaft to said driving pulley when said crankshaft equals or exceeds a specified number of rotations, and a gear ratio controller for changing a gear ratio by varying a groove width of said driving pulley, said transmission controller comprising:

a gear ratio detector for detecting a gear ratio of said continuously variable transmission system; and a pulley number-of-revolution detector for detecting the number of revolutions of said driving pulley, wherein said gear ratio controller varies a gear-ratio control start time based on at least one of said gear ratio and a rotating state of said driving pulley.

10. A transmission controller for a continuously variable transmission system according to claim 9, wherein said engine includes a throttle valve, and said transmission controller further comprises:

a throttle opening detector for detecting a throttle opening of said throttle valve; and a drive control element for performing a control operation to stop said engine when said throttle opening becomes a specified value or less, wherein said gear ratio controller starts controlling the gear ratio when said engine is stopped by said drive control element.

11. A transmission controller for a continuously variable transmission system according to claim 9, wherein said gear ratio controller starts controlling the gear ratio at a point where the number of revolutions of said driving pulley equals or exceeds a reference number of revolutions that increases as the gear ratio of said continuously variable transmission system increases.

12. A transmission controller for a continuously variable transmission system according to claim 10, wherein said gear ratio controller starts controlling the gear ratio at a point where the number of revolutions of said driving pulley equals or exceeds a reference number of revolutions that increases as the gear ratio of said continuously variable transmission system increases.

13. A transmission controller for a continuously variable transmission system according to claim 9, wherein said gear ratio controller includes an actuator having an output amount which changes based on a duty ratio of a control signal, and the duty ratio of the control signal supplied to said actuator is increased as the gear ratio of said continuously variable transmission system increases.

14. A transmission controller for a continuously variable transmission system according to claim 10, wherein said gear ratio controller includes an actuator having an output amount which changes based on a duty ratio of a control signal, and the duty ratio of the control signal supplied to said actuator is increased as the gear ratio of said continuously variable transmission system increases.

15. A transmission controller for a continuously variable transmission system according to claim 9, wherein said gear ratio controller includes an actuator having an output amount which changes based on a duty ratio of a control signal, and the duty ratio of the control signal supplied to said actuator is increased as a rotation-speed change rate of said driving pulley increases.

16. A transmission controller for a continuously variable transmission system according to claim 10, wherein said gear ratio controller includes an actuator having an output amount which changes based on a duty ratio of a control signal, and the duty ratio of the control signal supplied to said actuator is increased as a rotation-speed change rate of said driving pulley increases.

* * * * *